United States Patent
Mori et al.

(10) Patent No.: US 7,511,458 B2
(45) Date of Patent: Mar. 31, 2009

(54) CHARGING APPARATUS

(75) Inventors: Kiyoshi Mori, Kanagawa (JP); Yasushi Sato, Tokyo (JP)

(73) Assignees: NEC Electronics Corporation, Kanagawa (JP); Dai Nippon Printing Company, Ltd., Tokyo (JP)

( * ) Notice: Subject to any disclaimer, the term of this patent is extended or adjusted under 35 U.S.C. 154(b) by 131 days.

(21) Appl. No.: 11/386,812

(22) Filed: Mar. 23, 2006

(65) Prior Publication Data

US 2006/0232242 A1  Oct. 19, 2006

(30) Foreign Application Priority Data

Mar. 23, 2005  (JP) ............................. 2005-084365

(51) Int. Cl.
*H02J 7/00* (2006.01)
*H02J 7/04* (2006.01)

(52) U.S. Cl. ................. 320/128; 320/107; 320/145
(58) Field of Classification Search ................. 320/128, 320/107, 145
See application file for complete search history.

(56) References Cited

U.S. PATENT DOCUMENTS 6,133,712 A * 10/2000 Yeon .......................... 320/145
2004/0263125 A1 * 12/2004 Kanno et al. ................. 320/128

FOREIGN PATENT DOCUMENTS

| CN | 1525620 | 9/2004 |
| JP | 06-253467 | 9/1994 |
| JP | 2003-111292 | 4/2003 |
| JP | 2004-364393 | 10/2004 |

* cited by examiner

*Primary Examiner*—Akm E. Ullah
*Assistant Examiner*—Yalkew Fantu
(74) *Attorney, Agent, or Firm*—Young & Thompson (57) ABSTRACT

A charging apparatus includes a DC-DC converter for stepping down a charging input voltage, and a charging current controller having two input terminals and one output terminal. The input terminals receive a voltage based on a charging current drawn from a voltage stepped down by the DC-DC converter. The voltage at the output terminal serves as a control voltage for controlling the charging current drawn from the stepped-down voltage.

6 Claims, 10 Drawing Sheets

CHARGING APPARATUS

BACKGROUND OF THE INVENTION

1. Field of the Invention

The present invention generally relates to charging apparatus and particularly relates to a charging apparatus capable of reducing the power loss due to charging.

2. Description of Related Art

A secondary battery is widely used for various applications. The capacity of a secondary battery used in a mobile phone, for example, significantly increases recently, and the charging current increases accordingly in order to reduce charge time and increase user-friendliness. Though the power loss is inevitable for a charging circuit, an increase in the charging current results in an increase in the power loss in the charging circuit, which is a product of the charging current I and the voltage drop V in the charging circuit, and the heating becomes not negligible. The heating causes heat dissipation and other various adverse effects upon selection and mounting of a component and so on.

Description on a charging circuit can be found in Japanese Unexamined Patent Publications No. 2003-111292 and 2004-364393, for example. Neither of them, however, deals with the issue of heating in the charging circuit.

SUMMARY OF THE INVENTION

In view of the foregoing, the present invention is able to provide a charging apparatus for charging a secondary battery, which is capable of reducing power loss and heating due to charging.

To these ends, according to an aspect of the present invention, there is provided a charging apparatus which includes a DC-DC converter for stepping down a charging input voltage, and a charging current controller having two input terminals and one output terminal. In this charging apparatus, a voltage based on a charging current drawn from a voltage stepped down by the DC-DC converter is applicable between the two input terminals of the charging current controller, and the voltage at the output terminal serves as a control voltage for controlling the charging current drawn from the stepped-down voltage.

In this charging apparatus, the charging input voltage is stepped down by the DC-DC converter. Though slight power loss occurs upon the voltage step-down in the DC-DC converter since the conversion efficiency is generally not 100%, the amount of this power loss is small. In the charging current controller, the voltage at the output terminal serves as the voltage for controlling the current (charging current) which is drawn from the stepped-down voltage. By this control, the power loss decreases by the amount that the charging input voltage is stepped down by the DC-DC converter. It is thereby possible to reduce the power loss and heating due to charging.

According to the present invention, it is possible to reduce power loss and prevent excessive heating during charging in a charging apparatus for charging a secondary battery.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

In one aspect of the invention, a charging current controller is supplied through its input terminals with a voltage stepped down by a DC-DC converter and a voltage further stepped down based on the charging current drawn from the stepped-down voltage. This is one aspect for applying the voltage based on the charging current drawn from the voltage stepped down by the DC-DC converter between the input terminals of the charging current controller. In this case, a charging current is detected at the output of the DC-DC converter.

In another aspect, the charging current controller may be supplied through its input terminals with a voltage of a charging target to which a controlled charging current flows and a voltage which is higher than the voltage of a charging target by the amount of the voltage based on the controlled charging current. This is also one aspect for applying the voltage based on the charging current drawn from the voltage stepped down by the DC-DC converter between the two input terminals of the charging current controller. In this case, a charging current is detected at the input of the charging target, which is a current inflow portion.

In another aspect, there may be provided a resistor that generates the voltage based on the charging current drawn from the voltage stepped down by the DC-DC converter as the both-end voltage. For example, the resistor for detecting the charging current may be embedded in or provided for a charging apparatus.

In another aspect, there may be further provided a current control device that receives the voltage at the output terminal of the charging current controller as a control voltage and controls the charging current drawn from the stepped-down voltage. For example, the current control device for controlling the charging current may be embedded in or provided for a charging apparatus.

In another aspect, there may be further provided a voltage monitor that monitors the voltage of a charging target so that, when the result of monitoring the charging target reaches a prescribed voltage, it works the charging current controller to control the voltage at the output terminal of the charging current controller so as to suppress the charging current. This enables the suppression of the charging current depending on the progress of the charging to the charging target, which is the secondary battery. The suppression may digitally turn on or off the charging current in some cases. It is thereby possible to smoothly terminate the charging according to the characteristics of the secondary battery.

In another aspect, the DC-DC converter may set a substantially constant stepped-down voltage regardless of the value of a charging input voltage. This allows the degree of power loss and heating to remain almost the same despite of variations in the value of the charging input voltage.

In another aspect, the DC-DC converter may have a reference voltage input section that defines the value of the dropped-down voltage, to which the voltage of the charging target is fed back. In this structure, the voltage stepped down by the DC-DC converter is low when the charging target voltage is low and, as the charging target voltage increases due to charging, the voltage stepped down by the DC-DC converter increases accordingly. It is thereby possible to further reduce the power loss and heating at the time of charging depending on the progress of the charging to the charging target. Typically, the voltage applied to the reference voltage input section of the DC-DC converter may be a voltage after adding a constant voltage to the charging target voltage.

In another aspect, there may be further provided a diode that is disposed forwardly so as to lead the charging input voltage to the DC-DC converter. For example, the diode for preventing current backflow may be embedded in or provided for a charging apparatus.

Figure 1:
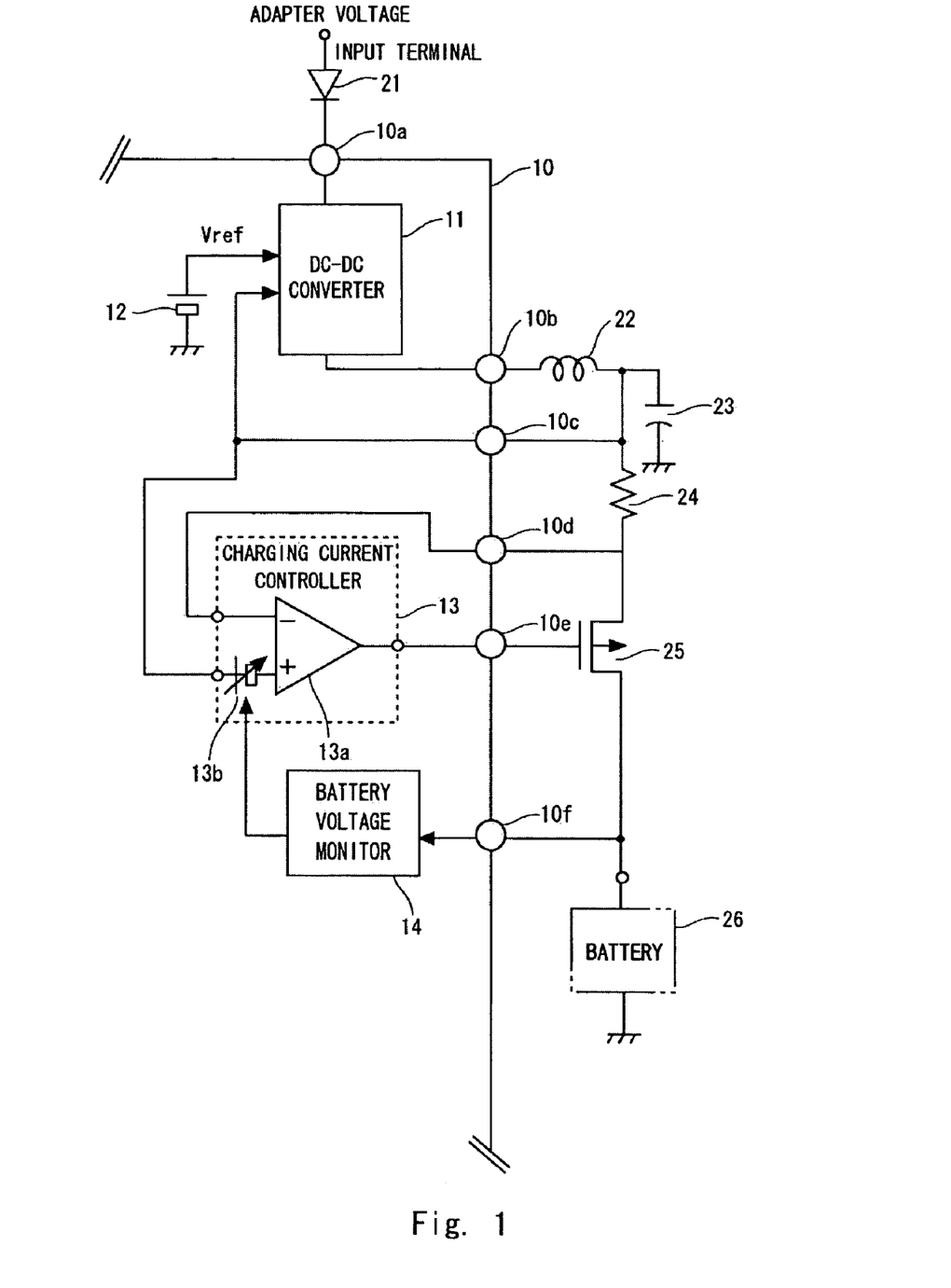
FIG. 1 is a circuit block diagram showing the structure of a charging apparatus according to an embodiment of the present invention.

In light of the foregoing, an embodiment of the present invention is described hereinafter with reference to the drawings. FIG. 1 is a circuit block diagram showing the structure of a charging apparatus according to an embodiment of the invention. As shown in FIG. 1, the charging apparatus has a charging circuit chip 10 and external devices connected thereto including a diode 21, an inductor 22, a capacitor 23, a resistor 24 and a P-channel field effect transistor (FET) 25.

The charging circuit chip 10 includes a DC-DC converter 11, a reference voltage source 12, a charging current controller 13 and a battery voltage monitor 14. The charging current controller 13 has an operational amplifier 13a and a voltage source 13b. The charging circuit chip 10 is electrically connected to each of the external devices via external connection terminals 10a, 10b, 10c, 10d, 10e and 10f.

The DC-DC converter 11 drops the voltage input through the terminal 10a and outputs the stepped-down voltage to the terminal 10b. Generally, the DC-DC converter 11 performs chopping (on/off switching) on the voltage supplied to the terminal 10a and outputs it to the terminal 10b. The degree of voltage drop depends on the duty ratio of the switching. The DC-DC converter 11 feeds back the output voltage from the terminal 10c, compares it with the voltage Vref of the reference voltage source 12 (the voltage to the reference voltage input section) and outputs a voltage so that these voltages are equal to each other. Thus, the on/off duty ratio is determined so that the voltage at the terminal 10c equals the voltage Vref and therefore the voltage at the terminal 10c does not change despite of change in the voltage applied to the terminal 10a.

The diode 21 which is connected to the terminal 10a is a device for preventing backflow of the current and its cathode is on the side of the terminal 10a. The diode 21 may be embedded in the charging circuit chip 10. The anode of the diode 21 is supplied with a voltage from an adapter, for example, as a charging input voltage. The voltage value from the adapter may be 6V, for example. One end of the inductor 22 is connected to the terminal 10b, and the other end is connected to the capacitor 23. The inductor 22 and the capacitor 23 form an LPF that low-passes (smoothens and commutates) the switching output waveform of the DC-DC converter 11. The voltage at the terminal 10c as the output of the LPF, which equals the voltage Vref of the reference voltage source 12, may be set to about 4.5V to 5V, for example.

The switching frequency of the DC-DC converter 11 may be set to about 100 kHz to 1 MHz, for example. Increasing the frequency is preferred in terms of enabling the use of smaller parts for the inductor 22 and the capacitor 23 forming the LPF.

The charging current controller 13 controls the source-drain current of the P-channel FET 25, which serves as a charging current. Thus, it controls the voltage drop that occurs in the resistor 24 so as to correspond to the amount of the charging current and receives the both-end voltage of the resistor 24 by two input terminals through the terminals 10c and 10d. Of the two input terminals of the charging current controller 13, the terminal with a higher voltage, which is on the side of the terminal 110c, is connected to the positive terminal of the voltage source 13b. The voltage at the negative terminal of the voltage source 13b is supplied to the noninverting input of the operational amplifier 13a. The voltage at the terminal 10d is supplied to the other input, the inverting input, of the operational amplifier 13a. The output of the operational amplifier 13a is connected to the gate of the P-channel FET 25 through the terminal 10e. The resistance value of the resistor 24 may be 0.33 Ω, for example.

In the configuration of the charging current controller, the both-end voltage of the resistor 24 is controlled to be equal to the voltage of the voltage source 13b. This is known by the fact that imaginary short-circuit is established between the input terminals of the operational amplifier 13a. Thus., the source-drain current of the P-channel FET 25 to serve as the charging current is controlled depending on the voltage of the voltage source 13b. Practically, the voltage source 13b is controlled according to a command from the battery voltage monitor 14. The source-drain current (charging current) of the P-channel FET 25, which is a current controlling device, may be controlled to be 0.5 A to 1.0 A at maximum, for example.

The battery voltage monitor 14 monitors a battery 26 which is a target of charging and connected to the drain of the P-channel FET 25 and adjusts the voltage at the voltage source 13b of the charging current controller 13 according to the monitoring result. Thus, the voltage at the battery 26 is input to the battery voltage monitor 14 via the terminal 10f. Generally, when the voltage at the battery 26 is low due to discharge, the voltage source 13b is controlled so that a maximum charging current flows into the battery 26 constantly. When the voltage at the battery 26 increases and it becomes close to the end of charging, the voltage at the voltage source 13b is reduced by analog control so as to reduce the charging current or it is adjusted by turn on/off control so as to control the on/off of the charging current.

The battery 26 is connected to the drain of the P-channel FET 25 and thereby supplied with the current and charged. Various secondary batteries maybe used for the battery 26. For example, a lithium ion battery is often used in the application of a mobile phone.

Figure 2A:
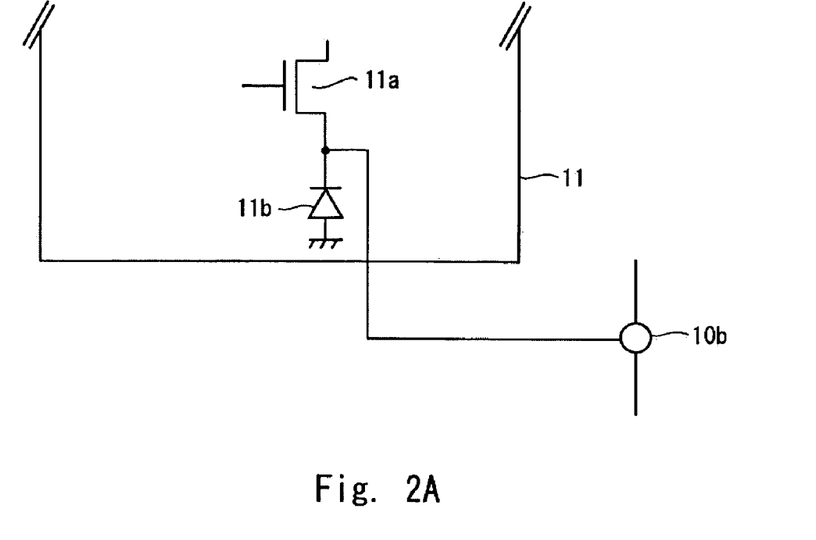
FIGS. 2A and 2B are views showing examples of a final output structure of a DC-DC converter 11 shown in FIG. 1.
Figure 2B:
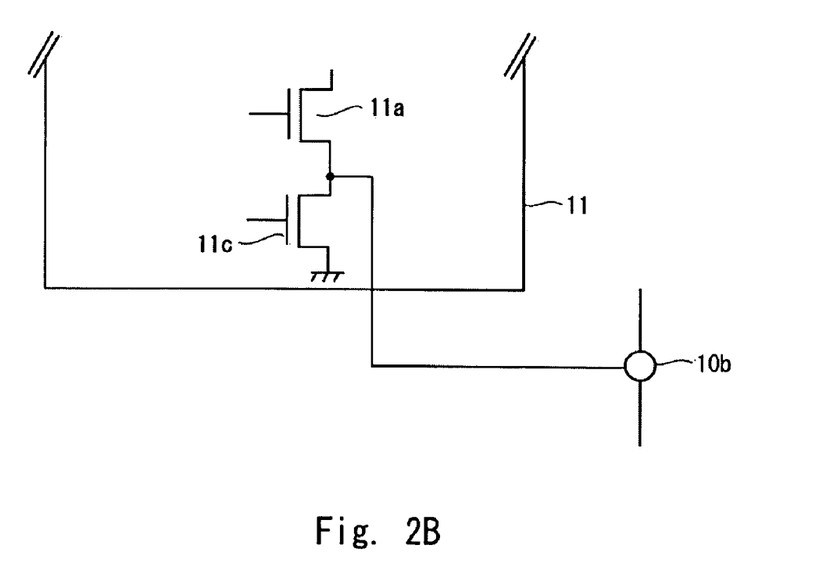

FIGS. 2A and 2B are views to complement FIG. 1 and show the final output structure of the DC-DC converter 11 shown in FIG. 1. In FIGS. 2A and 2B, the same elements as in FIG. 1 are denoted by the same reference numerals. In the examples shown in FIG. 2A, the current output terminal of a final output FET 11a that chops the current on and off is connected to the terminal 10b, and further a flywheel diode 11b is connected as shown in FIG. 2A. The flywheel diode 11b turns on when the FET 11a turns off, thereby allowing continuous current output. The flywheel diode 11b preferably has a small forward voltage in order to reduce power loss, and a Schottky diode is preferred for use, for example.

In the example shown in FIG. 2B, a low-side FET 11c is connected to the current output terminal of the final output FET 11a. When the FET 11a turns off, the FET 11c turns on to enable the continuous current output. Thus, the FET 11a and the FET 11c are controlled to turn on exclusively. In the example of FIG. 2B, the residual voltage between source and drain is significantly low when the FET 11c is on, and thus the power loss is smaller than the case of using the diode.

Figure 3A:
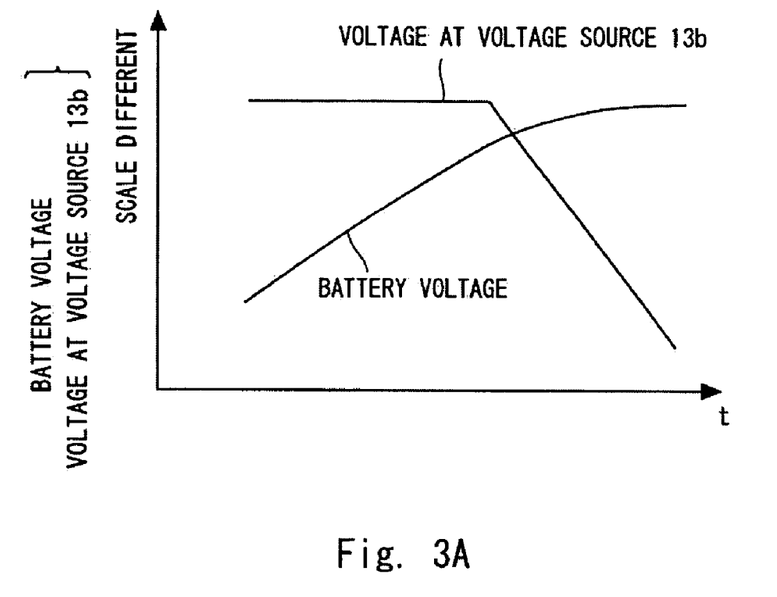
FIGS. 3A and 3B are views showing examples of a change with time in output voltage of a voltage source shown in FIG. 1.
Figure 3B:
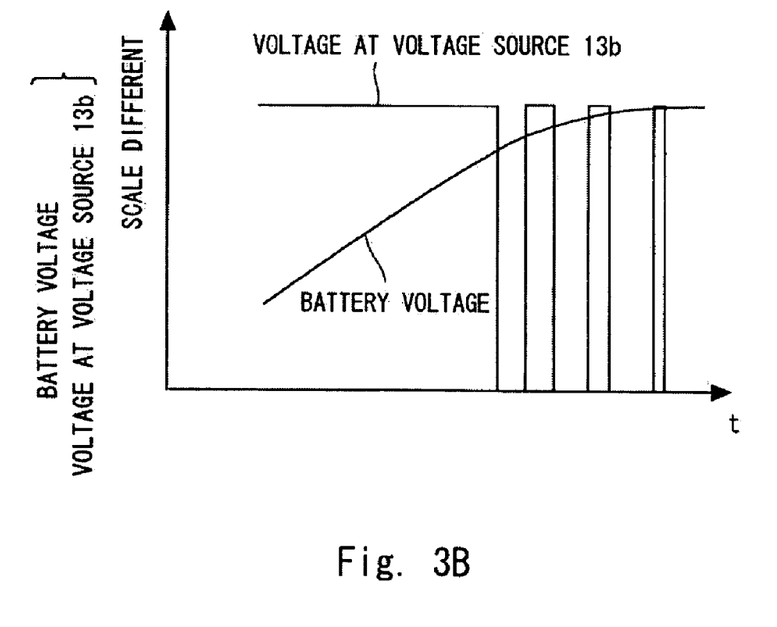

FIGS. 3A and 3B are also views to complement FIG. 1 and show examples of a change with time in the output voltage of the voltage source 13b shown in FIG. 1. The example of FIG. 3A starts the charging by setting the voltage at the voltage source 13b to a prescribed value according to the command from the battery voltage monitor 14. The voltage at the battery 26 thereby increases and when it reaches a predetermined value, the voltage at the voltage source 13b is then stepped down by analog control. The charging current thereby decreases in analog and an increase in the voltage at the battery 26 becomes slow thereafter, which allows smooth ending of the charging.

The example of FIG. 3B starts the charging by setting the voltage at the voltage source 13b to a prescribed value. The voltage at the battery 26 thereby increases and when it reaches a predetermined value, the voltage output from the voltage source 13b is shifted to on-off (zero) switching state. The charging current thereby turns on and off, and an increase in the voltage at the battery 26 becomes slow thereafter, which allows smooth ending of the charging. The charging current control as shown in FIGS. 3A and 3B is suited to the case in consideration of the internal resistance (and its change) in the battery 26.

The structure and operation of the charging apparatus shown in FIG. 1 is described in above. The charging apparatus having the above structure has a following advantage. The drain loss in the P-channel FET 25 decreases by the amount corresponding to the voltage drop in the DC-DC converter 11. This is clear when compared with the operation where the DC-DC converter 11 is eliminated. The charging apparatus with reduced power loss and heating due to charging is thereby obtained.

Figure 4:
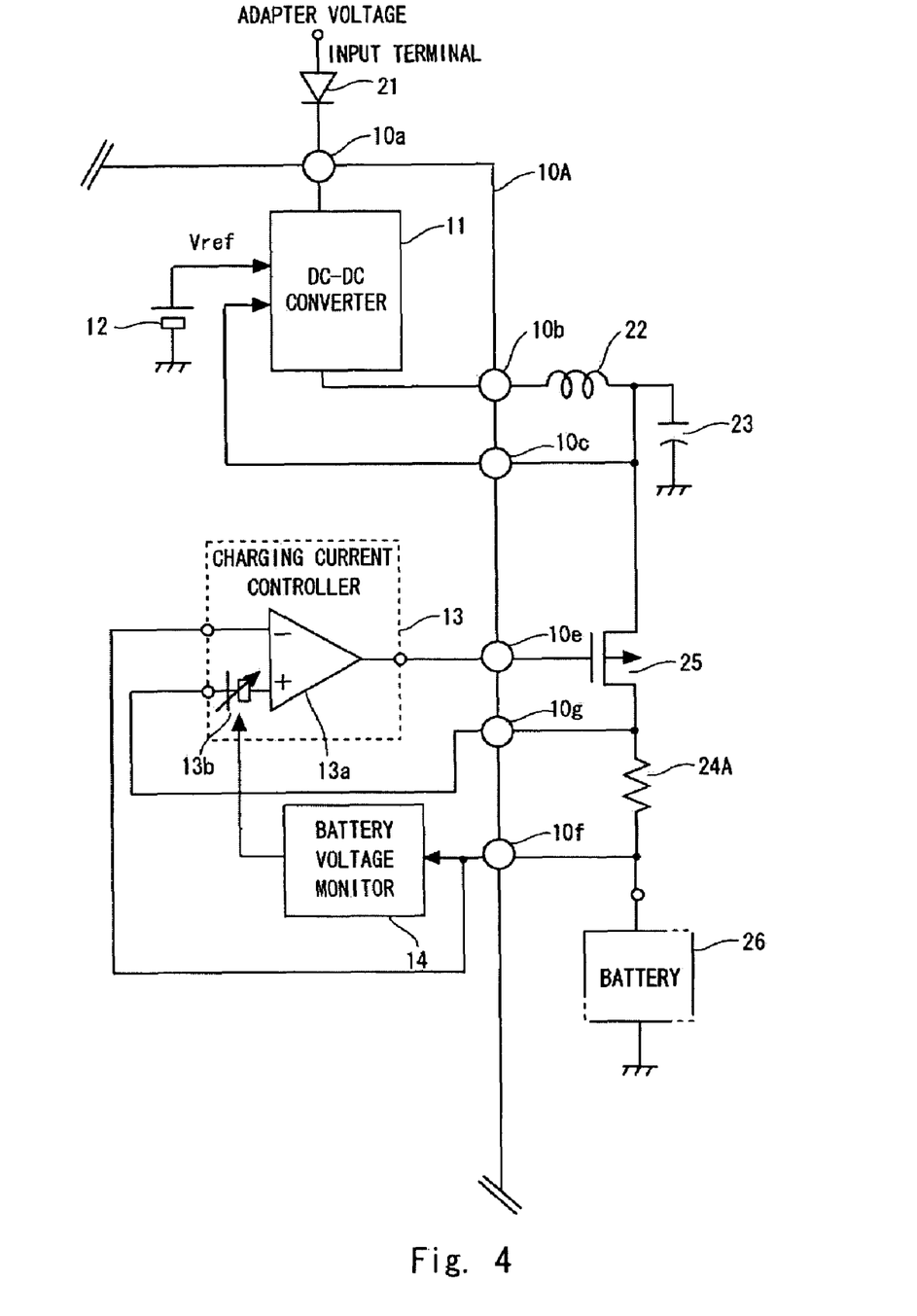
FIG. 4 is a circuit block diagram showing the structure of a charging apparatus according to another embodiment of the present invention.

Referring next to FIG. 4, a charging apparatus according to another embodiment of the invention is described hereinafter. FIG. 4 is a circuit block diagram showing the structure of a charging -apparatus according to another embodiment of the invention. In FIG. 4, the elements described earlier are denoted by the same reference numerals and not described in detail herein.

This charging apparatus replaces the resistor 24 for detecting the charging current shown in FIG. 1 with a resistor 24A having the same function. The resistor 24A is connected not to the source but to the drain of the P-channel FET 25. The both-end voltage of the resistor 24A is lead to the two input terminals of the charging current controller 13, which is the same as in the resistor 24 shown in FIG. 1. By the use of the resistor 24A instead of the resistor 24, the charging circuit chip 10A has a terminal 10g connected to the drain of the P-channel FET 25, not the terminal 10d connected to the source of the P-channel FET 25. The operation of the charging apparatus according to this embodiment is substantially the same as of the charging apparatus shown in FIG. 1.

Figure 5:
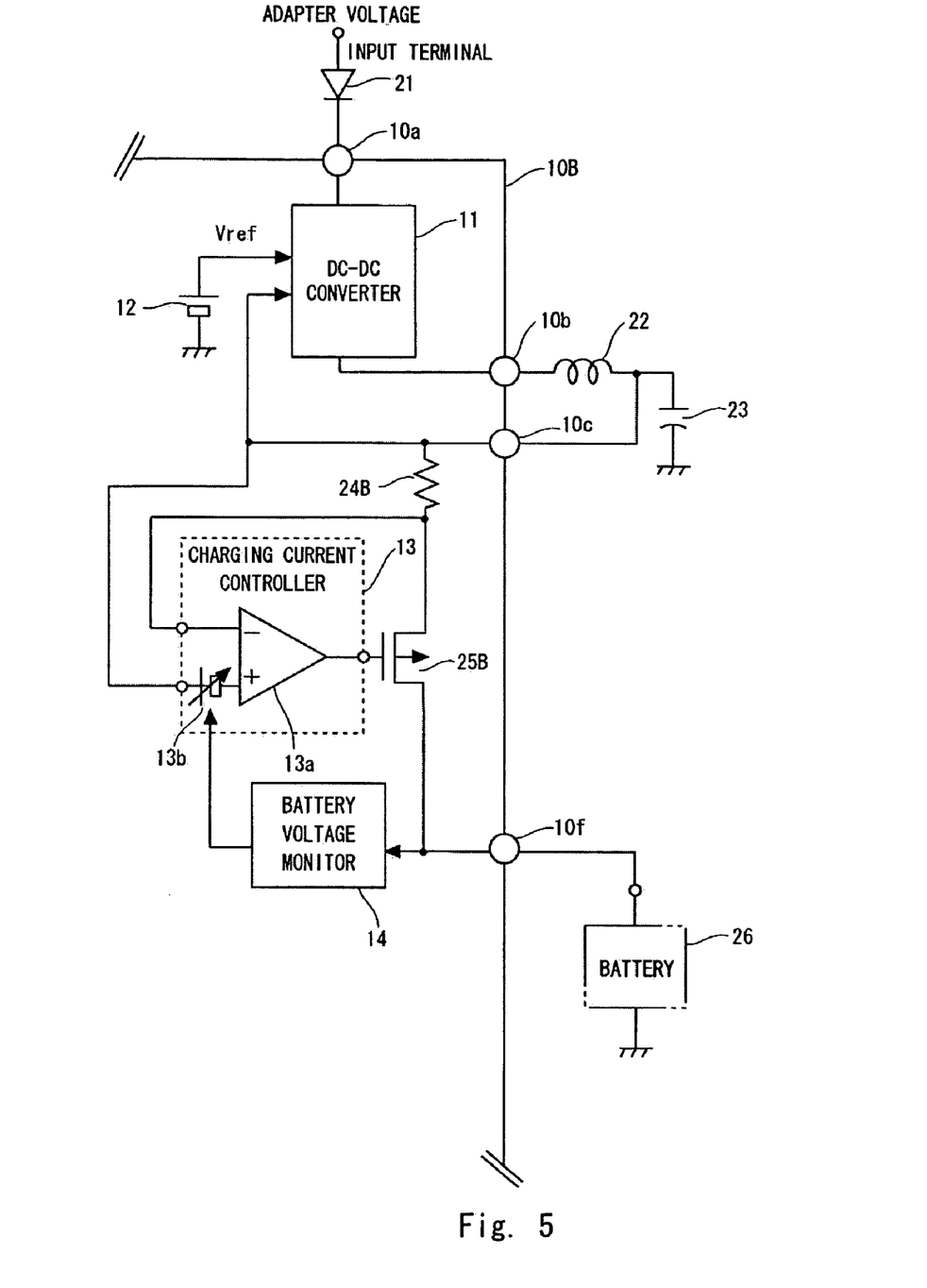
FIG. 5 is a circuit block diagram showing the structure of a charging apparatus according to another embodiment of the present invention.

Referring then to FIG. 5, a charging apparatus according to yet another embodiment of the present invention is described hereinafter. FIG. 5 is a circuit block diagram showing the structure of a charging apparatus according to another embodiment of the invention. In FIG. 5, the elements described earlier are denoted by the same reference numerals and not described in detail herein.

In this charging apparatus, the resistor 24 for detecting the charging current and the P-channel FET 25 for controlling the charging current are embedded in the charging circuit chip 10B as a resistor 24B and a P-channel FET 25B, respectively. Therefore, though the operation is the same as that of the charging apparatus shown in FIG. 1, the charging circuit chip 10B has added values because of the above elements being embedded. The elements can be embedded in the chip because the power loss and the heating in the P-channel FET 25B are reduced. The embedding eliminates the need for the terminals 10d and 10e in the charging circuit chip 10B. It is feasible to externally connect one of the resistor 24B and the P-channel FET 25B.

Figure 6:
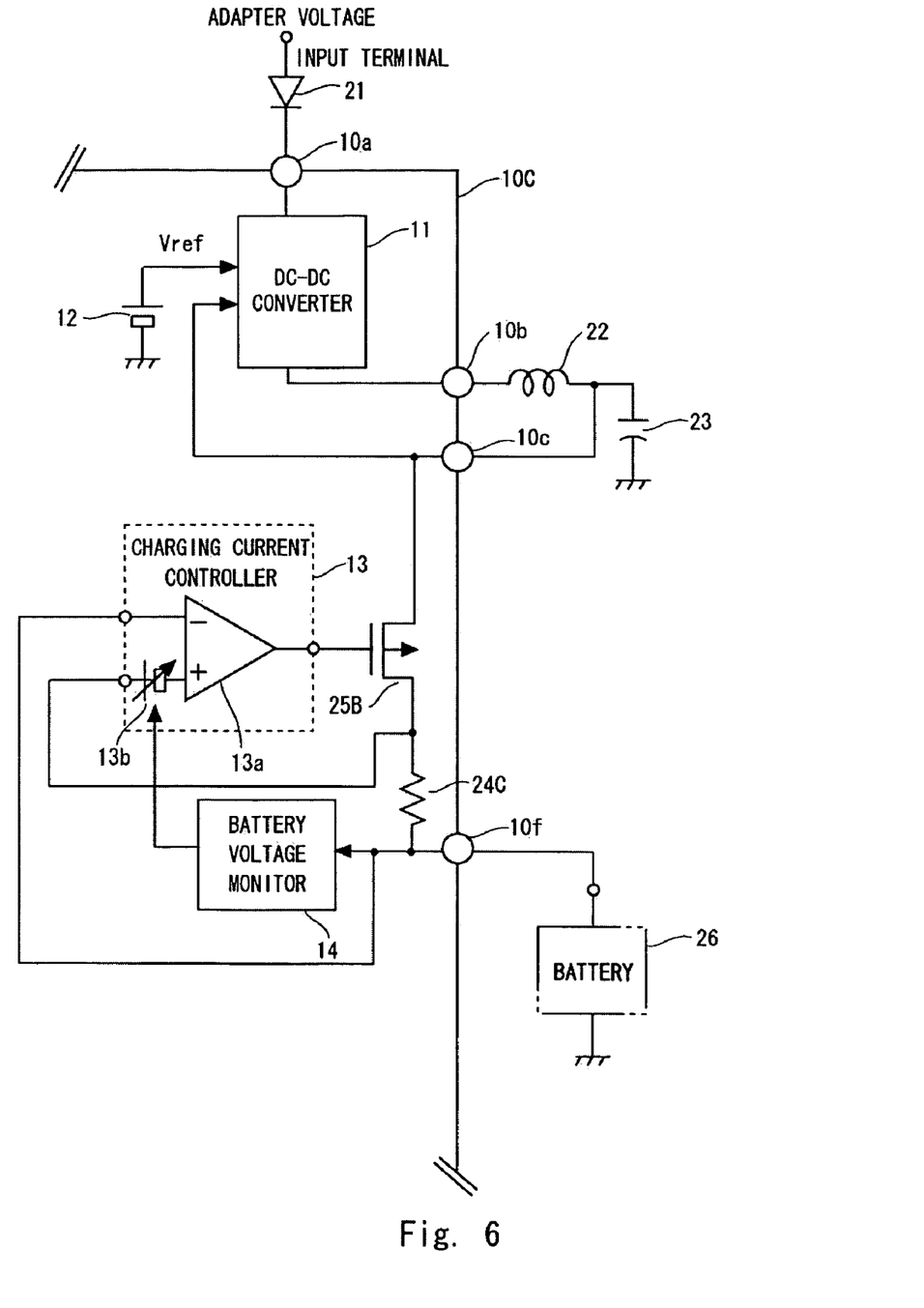
FIG. 6 is a circuit block diagram showing the structure of a charging apparatus according to another embodiment of the present invention.

Referring then to FIG. 6, a charging apparatus according to still another embodiment of the present invention is described hereinafter. FIG. 6 is a circuit block diagram showing the structure of a charging apparatus according to another embodiment of the invention. In FIG. 6, the elements described earlier are denoted by the same reference numerals and not described in detail herein.

In this charging apparatus, the elements of the charging apparatus shown in FIG. 4 are embedded in the same manner as shown in FIG. 5. Specifically, this embodiment replaces the P-channel FET 25 and the resistor 24A with the P-channel FET 25B and the resistor 24C which are embedded in the charging circuit chip 10C. The charging apparatus of this embodiment operates in substantially the same way as the charging apparatus of the embodiment shown in FIG. 4 and has substantially the same advantage as the charging apparatus of the embodiment shown in FIG. 5.

Figure 7:
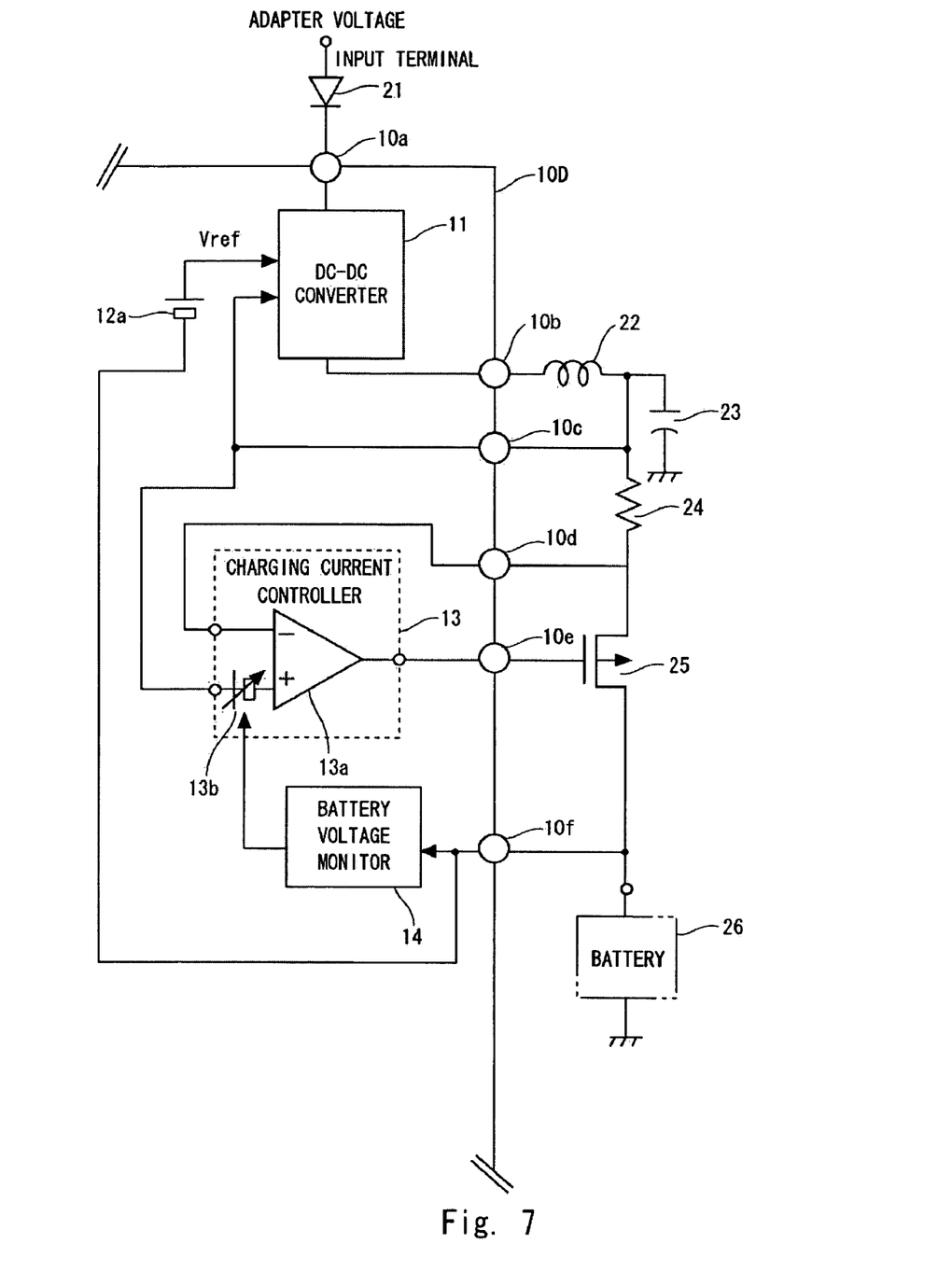
FIG. 7 is a circuit block diagram showing the structure of a charging apparatus according to another embodiment of the present invention.

Referring then to FIG. 7, a charging apparatus according to yet another embodiment of the present invention is described hereinafter. FIG. 7 is a circuit block diagram showing the structure of a charging apparatus according to another embodiment of the invention. In FIG. 7 the elements described earlier are denoted by the same reference numerals and not described in detail herein.

The charging circuit chip 10D of this embodiment is different from the chips of the above embodiments in the generation of the voltage Vref which is supplied to the DC-DC converter 11. Specifically, as shown in FIG. 7, the voltage of a constant voltage source 12a added with the voltage of the battery 26 is supplied to the DC-DC converter 11; in other words, the voltage of the battery 26 is fed back to the DC-DC converter 11. In this structure, the voltage at the terminal 10c, which is the output voltage of the DC-DC converter 11, changes according to the voltage of the battery 26.

In the early stage of the charging to the battery 26, the voltage at the battery 26 is low and therefore the voltage at the terminal 10c, which is the output voltage of the DC-DC converter 11, is also low. Since the voltage increases as the battery 20 is charged, the voltage at the terminal 10c as the output voltage of the DC-DC converter 11 increases accordingly. Thus, the source-drain voltage of the P-channel FET 25 is constant during the whole period of the charging, regardless of the level of the voltage at the battery 26. The drain loss due to the charging to the P-channel FET 25 is thereby cumulatively significantly lower than the embodiment shown in FIG. 1. The charging apparatus where the power loss and heating due to charging are further reduced is thereby obtained.

The voltage at the voltage source 12a may be set so that a low voltage (e.g. 0 several V) is generated between the source and drain of the P-channel FET 25 when the charging current is maximum.

Figure 8:
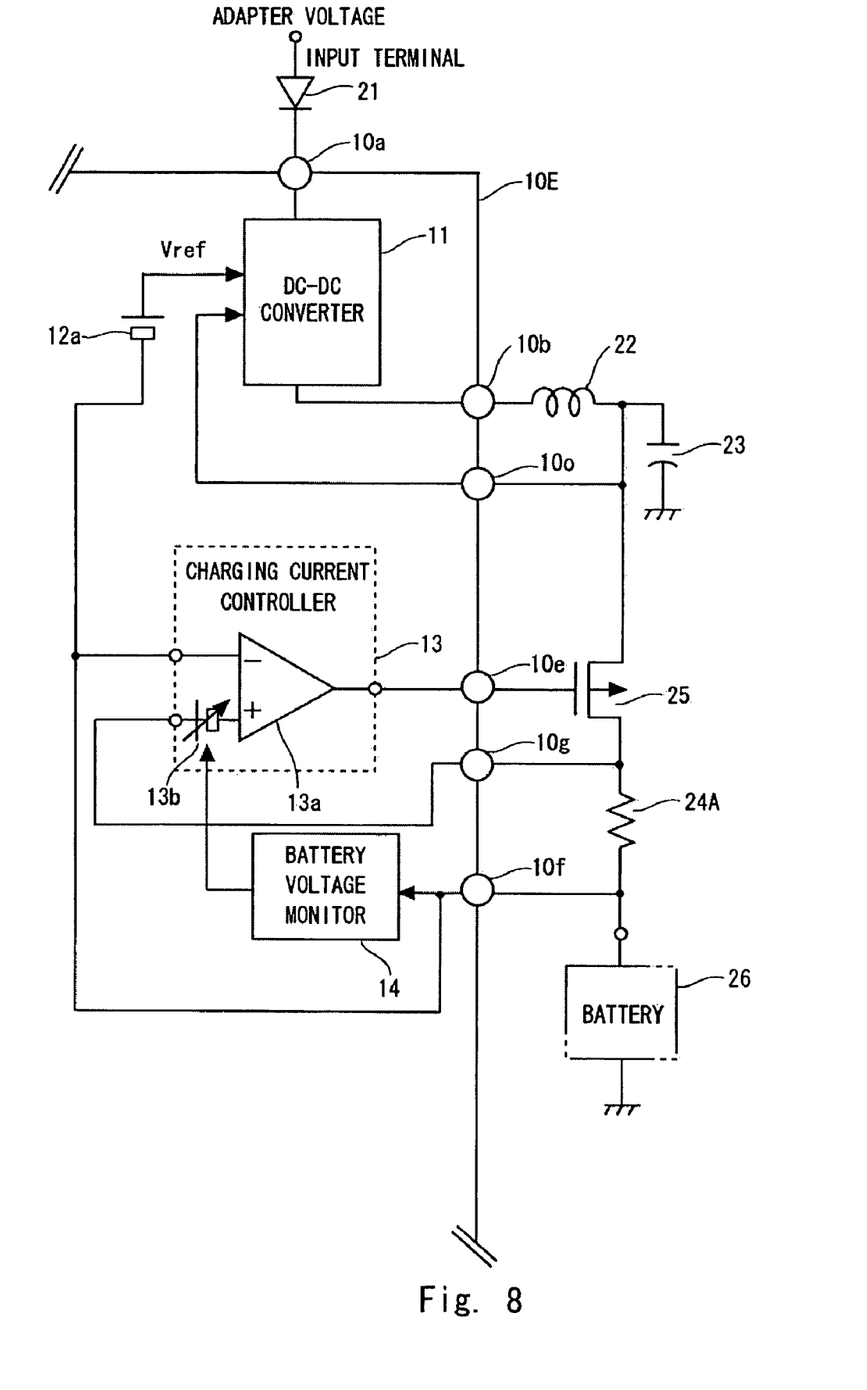
FIG. 8 is a circuit block diagram showing the structure of a charging apparatus according to another embodiment of the present invention.
Figure 9:
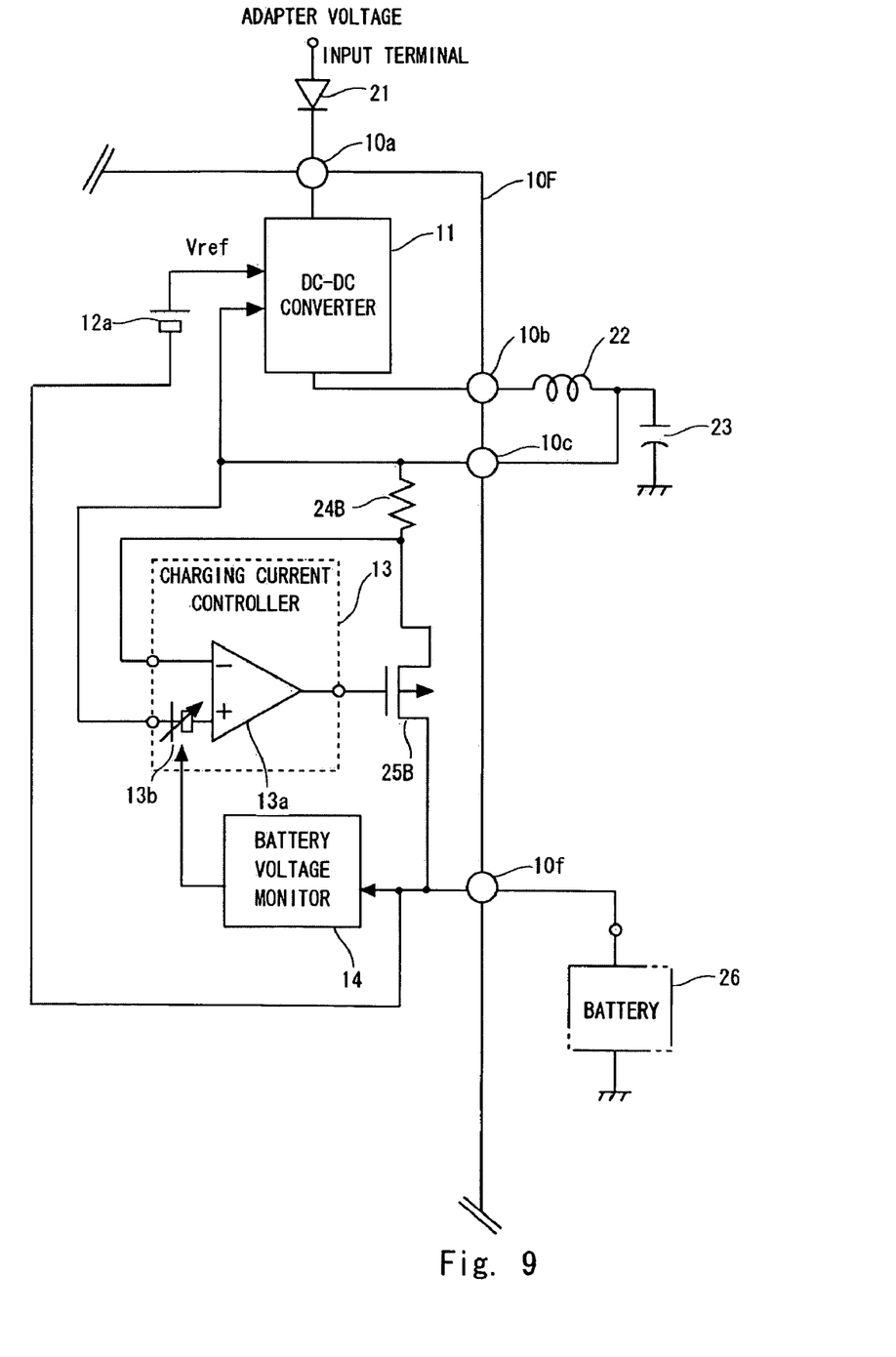
FIG. 9 is a circuit block diagram showing the structure of a charging apparatus according to another embodiment of the present invention.
Figure 10:
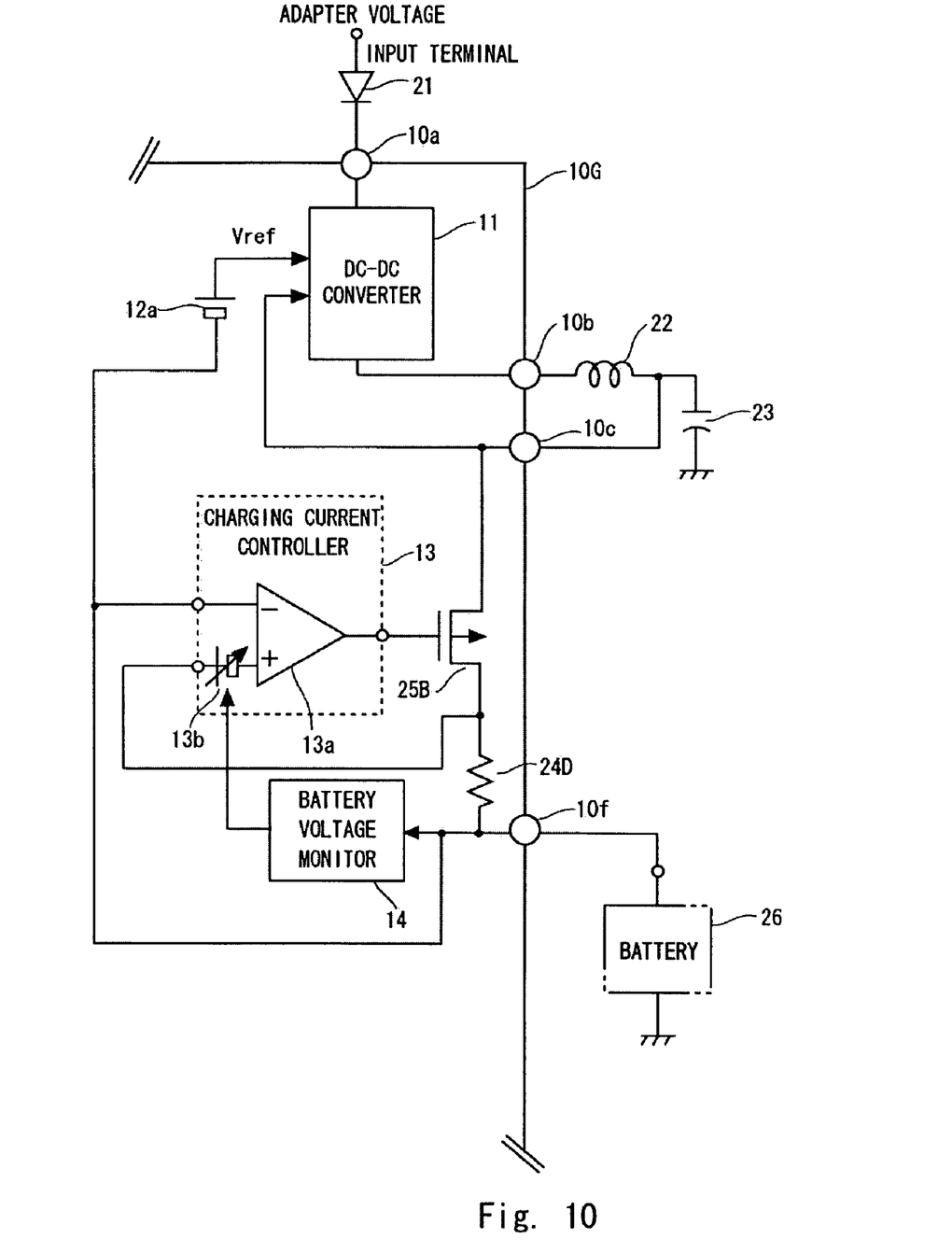
FIG. 10 is a circuit block diagram showing the structure of a charging apparatus according to another embodiment of the present invention.

Referring further to FIGS. 8, 9 and 10, charging apparatus according to other embodiments of the present invention are described hereinafter. FIGS. 8, 9 and 10 are circuit block diagrams showing the structures of charging apparatus according to other embodiments of the invention. In FIGS. 8, 9 and 10, the elements described earlier are denoted by the same reference numerals and not described in detail herein. The embodiments shown in FIGS. 8, 9 and 10 respectively apply the embodiments shown in FIGS. 4, 5 and 6 with respect to the embodiment of FIG. 1 to the embodiment shown in FIG. 7.

The charging apparatus of FIG. 8 replaces the resistor 24 for detecting the charging current with a resistor 24A having the same function. The resistor 24A is connected not to the source but to the drain of the P-channel FET 25. The both-end voltage of the resistor 24A is lead to the two input terminals of the charging current controller 13, which is the same as in the resistor 24 shown in FIG. 7. By the use of the resistor 24A instead of the resistor 24, the charging circuit chip 10E has a terminal 10g connected to the drain of the P-channel FET 25, not the terminal 10d connected to the source of the P-channel FET 25. The operation of the charging apparatus according to this embodiment is substantially the same as the charging apparatus shown in FIG. 7.

In the charging apparatus of FIG. 9, the resistor 24 for detecting the charging current and the P-channel FET 25 for controlling the charging current are embedded in the charging circuit chip 10F as a resistor 24B and a P-channel FET 25B, respectively. Therefore, though the operation is the same as that of the charging apparatus shown in FIG. 7, the charging circuit chip 10F has added values because of the above elements being embedded. The elements can be embedded in the chip because the power loss and the heating in the P-channel FET 25B are reduced as described earlier. The embedding eliminates the need for the terminals 10d and 10e in the charging circuit chip 10F. It is feasible to externally connect one of the resistor 24B and the P-channel FET 25B.

In the charging apparatus of FIG. 10, the elements of the charging apparatus shown in FIG. 9 are embedded in the same manner as shown in FIG. 9. Specifically, this embodiment replaces the P-channel FET 25 and the resistor 24A with the P-channel FET 25B and the resistor 24D which are embedded in the charging circuit chip 10G. The charging apparatus of this embodiment operates in substantially the same way as the charging apparatus of the embodiment shown in FIG. 8 and has substantially the same advantage as the charging apparatus of the embodiment shown in FIG. 9.

It is apparent that the present invention is not limited to the above embodiment that may be modified and changed without departing from the scope and spirit of the invention.

What is claimed is:

1. A charging apparatus comprising:
 a DC-DC converter for stepping down a charging input voltage;
 a charging current controller having two input terminals and one output terminal, the input terminals receiving a voltage based on a charging current drawn from a voltage stepped down by the DC-DC converter and the output terminal having a voltage serving as a control voltage for controlling the charging current drawn from the stepped-down voltage;
 a transistor having a gate that receives the control voltage from the output terminal and a source and drain that provide a source-drain current as the charging current in response to the control voltage at the gate; and
 a voltage monitor for monitoring a voltage of a charging target and, when a result of monitoring the charging target reaches a prescribed voltage, works the charging current controller to control the voltage at the output terminal of the charging current controller so as to surpress the charging current.

2. A charging apparatus comprising:
 a DC-DC converter for stepping down a charging input voltage;
 a charging current controller having two input terminals and one output terminal, the input terminals receiving a voltage based on a charging current drawn from a voltage stepped down by the DC-DC converter and the output terminal having a voltage serving as a control voltage for controlling the charging current drawn from the stepped-down voltage;
 a transistor having a gate that receives the control voltage from the output terminal and a source and drain that provide a source-drain current as the charging current in response to the control voltage at the gate; and
 a variable voltage source that is connected to one of the input terminals of the charging current controller, and a battery voltage monitor that monitors a voltage of a charging target, wherein an output of the battery voltage monitor is connected to the variable voltage source and controls a voltage of the variable voltage source in response to the voltage of the charging target sensed by the battery voltage monitor.

3. A charging apparatus comprising:
 a charging output terminal;
 a DC-DC converter responding to a charging input voltage and a first reference voltage and producing a charging output voltage at a voltage output node; and
 a charging current control circuit coupled between the charging output terminal and the voltage output node to supply a charging current to the charging output terminal, the charging current control circuit including a voltage source producing a second reference voltage separately from the first reference voltage and controlling the charging current in response to the second reference voltage,
 wherein the charging current control circuit further includes a voltage monitor circuit coupled between the charging output terminal and the voltage source to vary the second reference voltage in response to information of the charging output terminal.

4. The apparatus as claimed in claim 3, wherein the charging current control circuit further includes a resistor and a transistor connected in series between the output node and the charging output terminal, the charging current flowing through the resistor and the transistor.

5. The apparatus as claimed in claim 4, the charging current is controlled by the transistor such that a voltage drop of the resistor is relative to the second reference voltage.

6. The apparatus as claimed in claim 5, wherein the charging current control circuit further includes an operational amplifier having first input node coupled to one end of the resistor, a second input node coupled through the voltage source to the other end of the resistor, and an output node coupled to a control node of the transistor.

* * * * *